United States Patent [19]

Danis

[11] Patent Number: 4,488,920
[45] Date of Patent: Dec. 18, 1984

[54] PROCESS OF MAKING A CERAMIC HEAT EXCHANGER ELEMENT

[75] Inventor: Louis J. Danis, Battle Creek, Mich.

[73] Assignee: Williams International Corporation, Walled Lake, Mich.

[21] Appl. No.: 379,284

[22] Filed: May 18, 1982

[51] Int. Cl.³ .............................................. B32B 31/12
[52] U.S. Cl. ..................................... 156/155; 156/89;
156/242; 156/245; 165/166; 165/167; 264/59;
427/126.2; 427/249; 427/255
[58] Field of Search ................ 156/89, 155, 242, 245;
427/126.2, 228, 249, 255; 264/59; 165/1, 166, 167

[56] References Cited

U.S. PATENT DOCUMENTS

| | | | |
|---|---|---|---|
| 2,552,937 | 5/1951 | Cohen | 156/89 |
| 3,230,110 | 1/1966 | Smith | 427/249 |
| 3,528,809 | 9/1970 | Farnand et al. | 264/59 |
| 3,533,753 | 10/1970 | Berger | 264/59 |
| 3,781,152 | 12/1973 | Keller et al. | 264/59 |
| 3,924,034 | 12/1975 | Olcott | 427/249 |
| 4,362,209 | 12/1982 | Cleveland | 165/166 |

FOREIGN PATENT DOCUMENTS 149020 1/1962 U.S.S.R. .

*Primary Examiner*—Caleb Weston
*Attorney, Agent, or Firm*—Lyman R. Lyon

[57] ABSTRACT

The disclosure relates to a process for manufacturing a ceramic heat exchanger wherein a layer of ceramic material is deposited on a fugitive carbon form by chemical vapor deposition. The carbon form is thereafter burned away from the ceramic material to form a heat exchanger element. A plurality of heat exchanger elements are bonded to one another by chemical vapor deposition to form a homogeneous ceramic heat exchanger.

8 Claims, 5 Drawing Figures

PROCESS OF MAKING A CERAMIC HEAT EXCHANGER ELEMENT

The U.S. Government has a paid-up license in this invention and the right in limited circumstances to require the patent owner to license others on reasonable terms as provided for by the terms of contract No. F33615-78-C-2055 awarded by the Department of the Air Force.

BACKGROUND OF THE INVENTION

Gas turbine engines generally comprise a compressor for compressing air for the support of combustion, a combustion chamber having inlets for the compressed air and a fuel, and a rotatable turbine for extracting energy from the combustion gases produced in the combustion chamber. The hot gases produced in the combustion chamber are fed to the turbine which produces mechanical energy at a drive shaft. Since all of the heat energy in the exhaust gases is not generally extractable by the turbine, efficiency is improved by providing a recuperative heat exchanger on the exhaust side of the turbine for preheating the compressed combustion air. The exhaust gas generally flows in cross or counter-current relation to the compressed air flowing through the heat exchanger.

One problem that must be faced in the use of a recuperative heat exchanger is that gas turbines often exhibit operating temperatures over 1,000° C. The efficiency of the gas turbine depends in part on the efficiency of the heat exchanger in extracting the residual energy contained in the hot exhaust gases and preheating the compressed air supplied to the turbine. Because of the high temperature on the hot gas side of the heat exchanger, the materials for such equipment must be limited to highly heat resistant metals or ceramic materials. Moreover, since the efficiency of the heat exchanger is the ratio of heat actually transferred therein to the heat theoretically transferable by an infinitely large heat exchange surface, extensive heat exchange surface areas are required for recuperative heat exchanger of high efficiency.

Tube-type heat exchangers heretofore known and used require a great deal of the space. Thus, wherein weight and space are critical, such heat exchangers are impractical.

Cross flow heat exchangers of plate construction are also known as disclosed in "Problems of the Heat Exchanger for Vehicular Gas Turbines" by E. Tiefenbacher, in ASME Publication 76-GT-105 of 1976. However, substantial problems often arise relating to the control of heat stress to which the heat exchanger matrices are subject. It is also known to equip a gas turbines with a heat exchanger that operates regeneratively. Heat exchangers of this type often comprise ceramic discs that are driven in rotation. The discs revolve successively between segments of the exhaust and combustion air conduits so that there is alternately a heating and cooling of the discs in the respective heating and cooling zones. However, sealing of the rotating heat exchanger discs presents a serious problem because of the substantial pressure differential between the heating and cooling zones and because of the high environmental temperatures.

Thus, there is a need for an improved recuperative heat exchanger with a large heat exchange surface that can be packaged in a relatively compact assembly.

SUMMARY OF THE INVENTION

The invention relates to a recuperative heat exchanger, and a process for the manufacture thereof, comprising ceramic elements orientated to provide a plurality of cross flow channels separated by relatively thin walls. The heat exchanger and disclosed manufacturing process insure separation of the exhaust and intake gases that are in heat exchange relationship with each other. The heat exchanger elements are supported with respect to each other in a manner that compensates for thermal expansion.

DETAILED DESCRIPTION OF THE PREFERRED EMBODIMENT OF THE INVENTION

In accordance with the instant invention, a heat exchanger assembly 10 comprises a plurality of elements 12. In a constructed embodiment, each of the elements 12 comprises a flat plate 14 having a plurality of internal ribs 16 depending therefrom to maximize the heat exchange surface area. Each of the elements 12 is produced by chemical vapor deposition of a ceramic heat exchange surface. A plurality of elements 12 are bonded together to form the heat exchange assembly 10. The vapor deposition process is especially suited to the production of a compact heat exchanger potentially capable of operation at stresses to 150,000 psi at 2500° F. and 50,000 psi at 3000° F.

Figure 1:
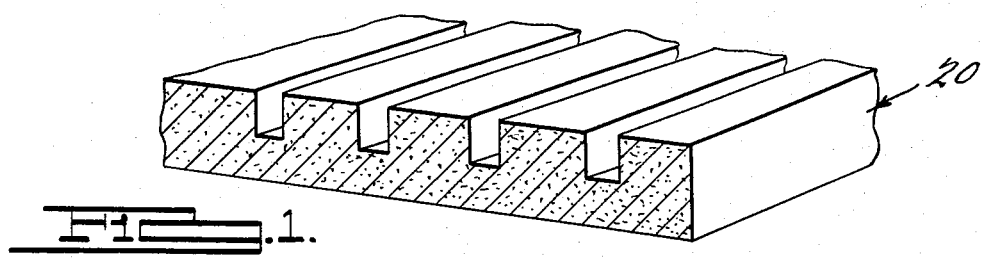
FIG. 1 is a perspective view of the fugitive carbon form.

Referring to FIG. 1, a fugitive carbon form 20 is molded or machined to the reverse image of the heat exchanger element 12.

Figure 2:
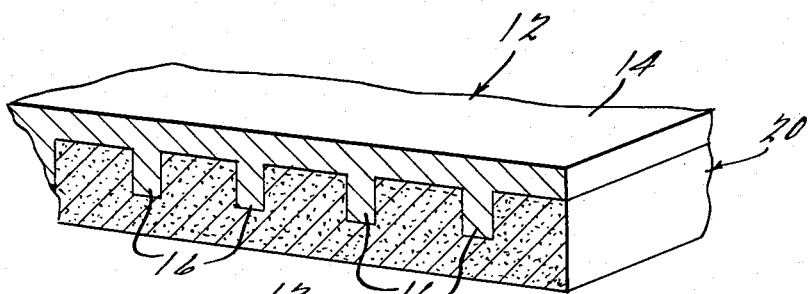
FIG. 2 is a view of the carbon form of FIG. 1 after vapor deposition of a ceramic coating.

As seen in FIG. 2, silicon carbide, silicon nitride, hafnium carbide, or a boride, of appropriate chemical vapor deposition depositability and end use properties for a heat exchange recuperator, is deposited on the form 20 by the pyrodissociation of methyltrichlorosilane. Disassociation of methyltrichlorosilane takes place substantially by the reaction:

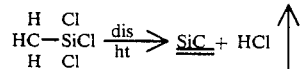

in which SiC is deposited at closely controlled dimensional rates so as to exhibit 0% porosity with a tensile strength of 200,000 psi+ at ambient temperature and at 2500° F.

Figure 3:
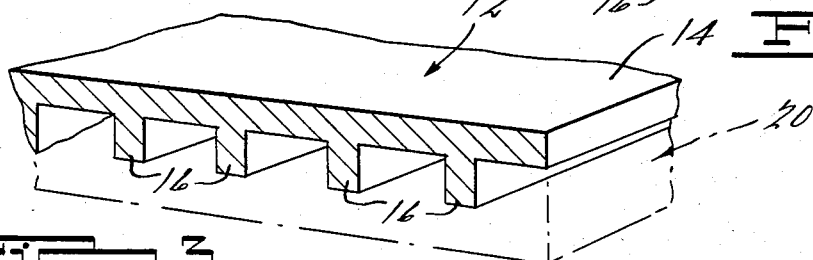
FIG. 3 is a view of the ceramic exchanger element after burn away of the carbon form.

As seen in FIG. 3, the carbon form 20 is thereafter burned away leaving the ceramic heat exchanger element 12. Flatness of the ceramic element 12 deposited by chemical vapor deposition is preserved after carbon burnout by careful selection of the fugitive carbon block 20 for match of thermal expansion coefficient with the particular chemical vapor deposition material used and rate-controlled "burn away" processing.

Figure 4:
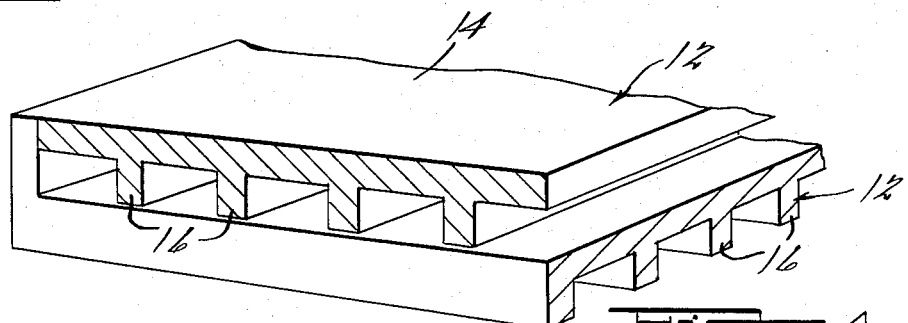
FIGS. 4 and 5 are views of an assembled heat exchanger.
Figure 5:
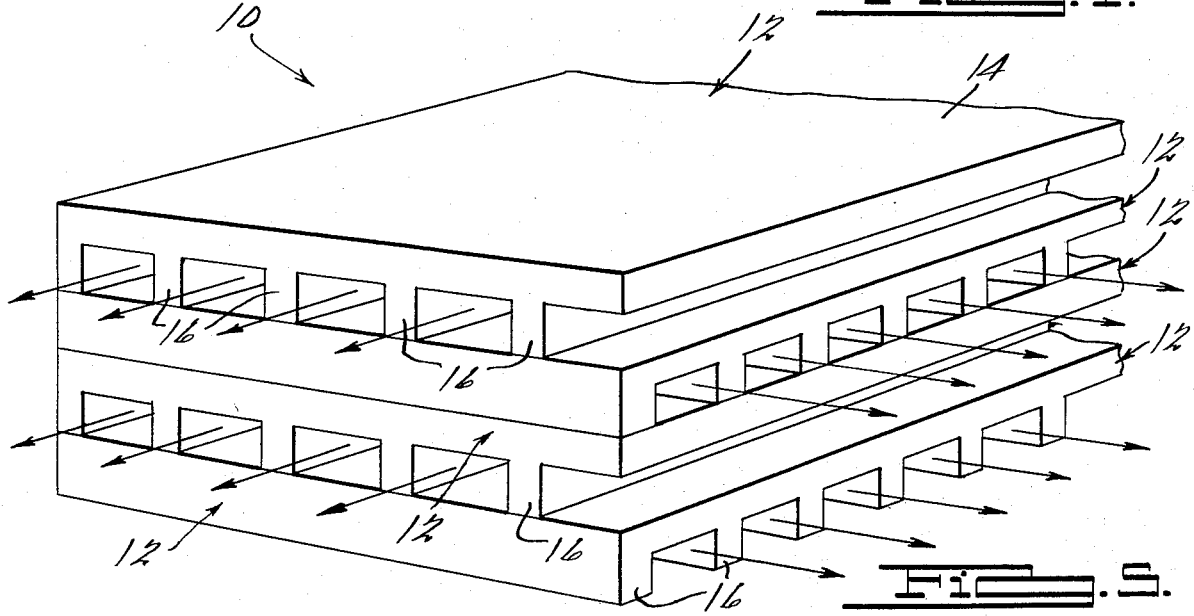

As seen in FIG. 4, the exchanger elements 12 are bonded and sealed relative to one another by additional chemical vapor deposition after being stacked in the alternating arrangement illustrated. Alternatively, the elements 12 may be bonded to one another by use of ceramic brazing agents such as silicon-titanium or other ceramic cements.

While the preferred embodiment of the invention has been disclosed, it should be appreciated that the invention is susceptible of modification without departing from the scope of the following claims.

I claim:

1. A process for manufacturing a ceramic heat exchanger comprising the steps of
    shaping a fugitive carbon form,
    depositing a layer of ceramic material on said carbon form by chemical vapor deposition,
    burning said carbon form away from said ceramic material to form a heat exchanger element, and
    bonding a plurality of said heat exchanger elements to one another to form said heat exchanger.

2. A process as set forth in claim 1 wherein said bonding step comprises chemical vapor deposition.

3. A process as set forth in claim 1 wherein said vapor deposition comprises disassociation of methyltrichlorosilane.

4. A process in accordance with claim 1 wherein the ceramic material comprises silicon carbide.

5. A process in accordance with claim 1 wherein the ceramic material comprises silicon nitride.

6. A process in accordance with claim 1 wherein said bonding step comprises ceramic brazing.

7. A process in accordance with claim 1 wherein the ceramic material comprises hafnium carbide.

8. A process in accordance with claim 1 wherein the ceramic material comprises a boride.

* * * * *